(12) United States Patent
Katic

(10) Patent No.: US 10,268,763 B2
(45) Date of Patent: Apr. 23, 2019

(54) RANKING EXTERNAL CONTENT ON ONLINE SOCIAL NETWORKS

(71) Applicant: Facebook, Inc., Menlo Park, CA (US)

(72) Inventor: Vojin Katic, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 410 days.

(21) Appl. No.: 14/341,148

(22) Filed: Jul. 25, 2014

(65) Prior Publication Data

US 2016/0026713 A1 Jan. 28, 2016

(51) Int. Cl.
*G06F 17/30* (2006.01)
*H04L 29/06* (2006.01)
*H04L 29/08* (2006.01)

(52) U.S. Cl.
CPC .... *G06F 17/30864* (2013.01); *G06F 17/3053* (2013.01); *G06F 17/30587* (2013.01); *G06F 17/30958* (2013.01); *H04L 67/02* (2013.01); *H04L 67/104* (2013.01); *H04L 67/18* (2013.01); *H04L 67/20* (2013.01); *H04L 67/306* (2013.01); *H04L 67/42* (2013.01)

(58) Field of Classification Search
CPC ....... H04L 67/02; H04L 67/104; H04L 67/18; H04L 67/20; H04L 67/306; H04L 67/42
See application file for complete search history.

(56) References Cited

U.S. PATENT DOCUMENTS

| 6,539,232 | B2 | 3/2003 | Hendrey |
| 6,957,184 | B2 | 10/2005 | Schmid |
| 7,539,697 | B1 | 5/2009 | Akella |
| 7,752,326 | B2 | 7/2010 | Smit |
| 7,836,044 | B2 | 11/2010 | Kamvar |

(Continued)

FOREIGN PATENT DOCUMENTS

| JP | 2012510667 A | 5/2012 |
| JP | 2014501986 A | 1/2014 |

(Continued)

OTHER PUBLICATIONS

International Search Report and Written Opinion for PCT application PCT/US2014/048414, dated Apr. 27, 2015.

(Continued)

*Primary Examiner* — Matthew J Ellis
(74) *Attorney, Agent, or Firm* — Baker Botts L.L.P.

(57) ABSTRACT

In one embodiment, a social-networking system may access an enhanced search index of an online social network. The enhanced search index may include data from a social graph having a plurality of nodes and a plurality of edges connecting the nodes, where the nodes comprise a plurality of internal nodes corresponding to entities associated with the online social network, and a plurality of external nodes corresponding to objects associated with a third-party system. The social-networking system may then search the enhanced search index in response to a query received from a user to identify objects that substantially match the query. Each identified object may be scored by the social-networking system based at least in part on a connectivity of the corresponding external node to the one or more internal nodes. In response to the query, the social-networking system may send a search-results page referencing objects based on their scores.

43 Claims, 5 Drawing Sheets

(56) References Cited

U.S. PATENT DOCUMENTS

| | | |
|---|---|---|
| 8,027,990 B1 | 9/2011 | Mysen |
| 8,060,639 B2 | 11/2011 | Smit |
| 8,112,529 B2 | 2/2012 | Van Den Oord |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 * | 10/2013 | Lee .................. G06Q 50/01 707/798 |
| 8,595,297 B2 | 11/2013 | Marcucci |
| 8,601,027 B2 | 12/2013 | Behforooz |
| 8,732,208 B2 | 5/2014 | Lee |
| 8,751,521 B2 | 6/2014 | Lee |
| 8,782,080 B2 | 7/2014 | Lee |
| 9,152,312 B1 * | 10/2015 | Terleski ............. G06F 3/0488 |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci |
| 2005/0171955 A1 | 8/2005 | Hull |
| 2006/0136419 A1 | 6/2006 | Brydon |
| 2007/0277100 A1 | 11/2007 | Sheha |
| 2008/0072180 A1 | 3/2008 | Chevalier |
| 2008/0183695 A1 | 7/2008 | Jadhav |
| 2008/0270615 A1 | 10/2008 | Centola |
| 2009/0006543 A1 | 1/2009 | Smit |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippori |
| 2010/0049802 A1 | 2/2010 | Raman |
| 2010/0228744 A1 | 9/2010 | Craswell |
| 2010/0235354 A1 | 9/2010 | Gargaro |
| 2011/0004692 A1 * | 1/2011 | Occhino ............. H04L 67/16 709/228 |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0276396 A1 | 11/2011 | Rathod |
| 2011/0307494 A1 | 12/2011 | Snow |
| 2011/0313992 A1 | 12/2011 | Groeneveld |
| 2012/0016857 A1 * | 1/2012 | Gross ............... G06F 17/30861 707/706 |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2013/0031106 A1 | 1/2013 | Schechter |
| 2013/0041876 A1 | 2/2013 | Dow |
| 2013/0066876 A1 | 3/2013 | Raskino |
| 2013/0073568 A1 | 3/2013 | Federov |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0304730 A1 * | 11/2013 | Zhou ............... G06F 17/30864 707/723 |
| 2014/0032564 A1 | 1/2014 | Sankar |
| 2014/0181091 A1 | 6/2014 | Lassen |
| 2014/0280121 A1 * | 9/2014 | Sharp ............... G06F 17/3053 707/732 |

FOREIGN PATENT DOCUMENTS

| | | |
|---|---|---|
| JP | 2014516184 A | 7/2014 |
| WO | WO 2013/175410 A1 | 11/2013 |
| WO | WO 2014036052 A1 | 3/2014 |

OTHER PUBLICATIONS

European Patent Office Extended Search Report for Application No./Patent No. 14194960.2-1958, dated Dec. 4, 2015.

JP OA received from JPO for Patent Application No. 2017-503984. (with English Translation), dated Sep. 11, 2018.

* cited by examiner

|  | signal_1 | signal_2 | ... | signal_k |
|---|---|---|---|---|
| object_1 | $score_1(1)$ | $score_1(2)$ |  | $score_1(k)$ |
| object_2 | $score_2(1)$ | $score_2(2)$ | ... | $score_2(k)$ |
| object_3 | $score_3(1)$ | $score_3(2)$ |  | $score_3(k)$ |
| ⋮ | ⋮ | ⋮ | ⋱ | ⋮ |
| object_N | $score_N(1)$ | $score_N(2)$ | ... | $score_N(k)$ |

*FIG. 3*

|  | impressions | interactions/ impressions | text similarity | social relevance |
|---|---|---|---|---|
| object_1 | 10 | 2 | 6 | 9 |
| object_2 | 9 | 2 | 9 | 4 |
| object_3 | 8 | 7 | 9 | 8 |
| object_4 | 8 | 9 | 8 | 7 |
| object_5 | 5 | 10 | 7 | 10 |
| object_6 | 5 | 6 | 6 | 1 |
| object_7 | 4 | 3 | 10 | 1 |

*FIG. 4*

RANKING EXTERNAL CONTENT ON ONLINE SOCIAL NETWORKS

TECHNICAL FIELD

This disclosure generally relates to social graphs and performing searches for objects in the context of a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system associated with an online social network may access an enhanced search index of the online social network. The enhanced search index may be a search index that is enhanced by internal social-networking related information, such as, for example, social-graph information, comments and links within the online social network, etc. The internal social-networking information may comprise a social graph data structure having a plurality of nodes and a plurality of edges connecting the nodes. Each of the edges between two of the nodes may represent a single degree of separation between them. The nodes may include a first node that corresponds to a first user associated with the online social network. The nodes may also comprise a plurality of internal nodes that each corresponds to a concept or a second user associated with the online social network. The nodes may also comprise a plurality of external nodes that each corresponds to a content object associated with a third-party system. Examples of an external content object include a webpage, a resource (such as, for example, an audio file, video file, digital photo, text file, structured document, or application), a game, or any suitable online content.

In particular embodiments, the social-networking system may receive a query from a user of the online social network hosted by the social-networking system. In response to the user's query, the social-networking system may search the enhanced search index to identify content objects that substantially match the query, where each identified object corresponds to an external node. The social-networking system may score each of the identified content object based at least in part on a connectivity of the external node to the one or more internal nodes. For example, the identified content objects may be scored based on impressions, interactions, and degrees of separation between social-graph nodes. As an example, for scoring an identified content object based on degree of separation, an external node associated with the identified content object that has one degree of separation with respect to the querying user may have a higher degree-of-separation score than an external node that is two degrees of separation from the querying user. In response to the user's query, the social-networking system may send a search-results page comprising the identified content objects for display to the first user. In particular embodiments, each identified content object may have a score greater than the threshold score.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 3 illustrates an example set of objects identified in response to a query.

FIG. 4 illustrates an example set of objects identified in response to a query.

DESCRIPTION OF EXAMPLE EMBODIMENTS

System Overview

Figure 1:
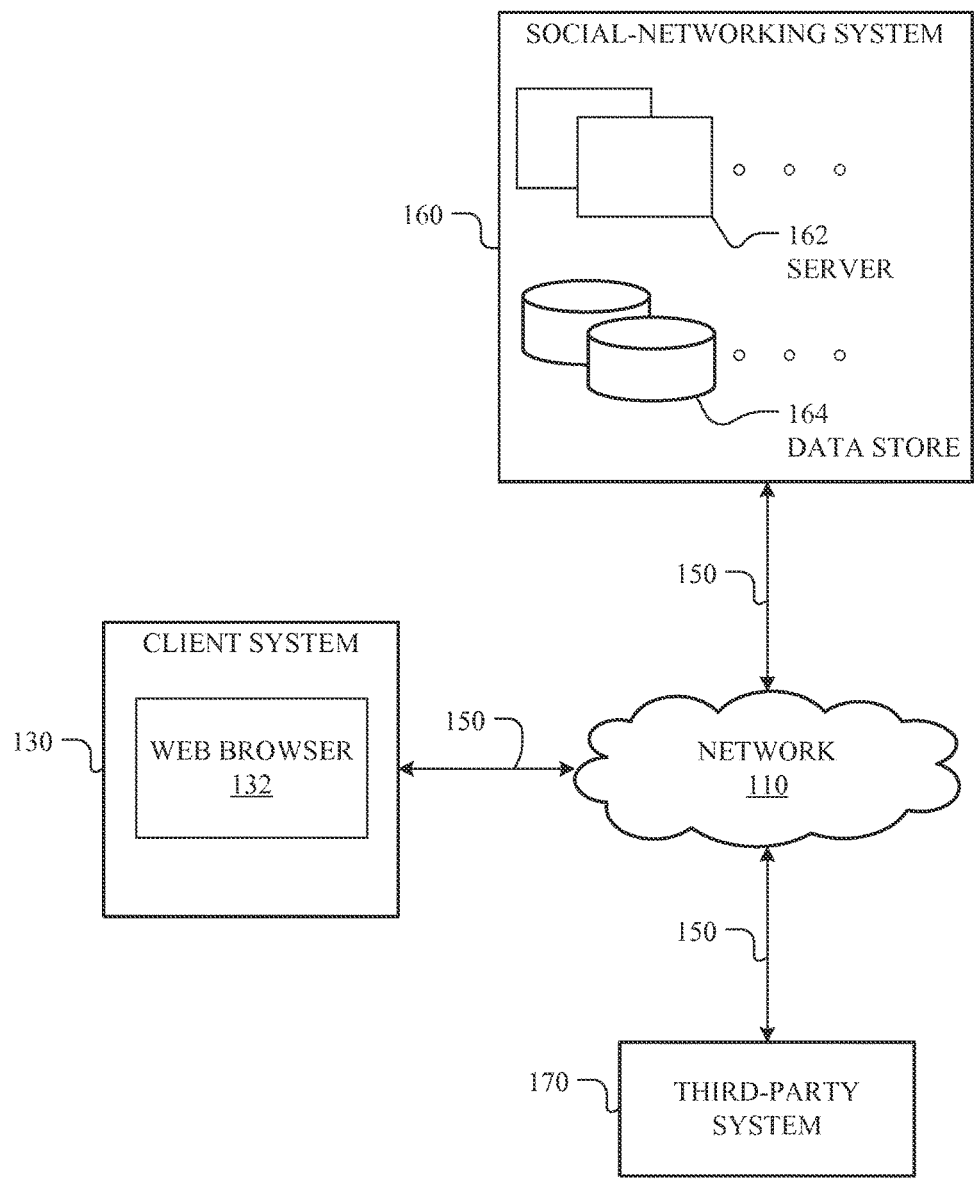
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
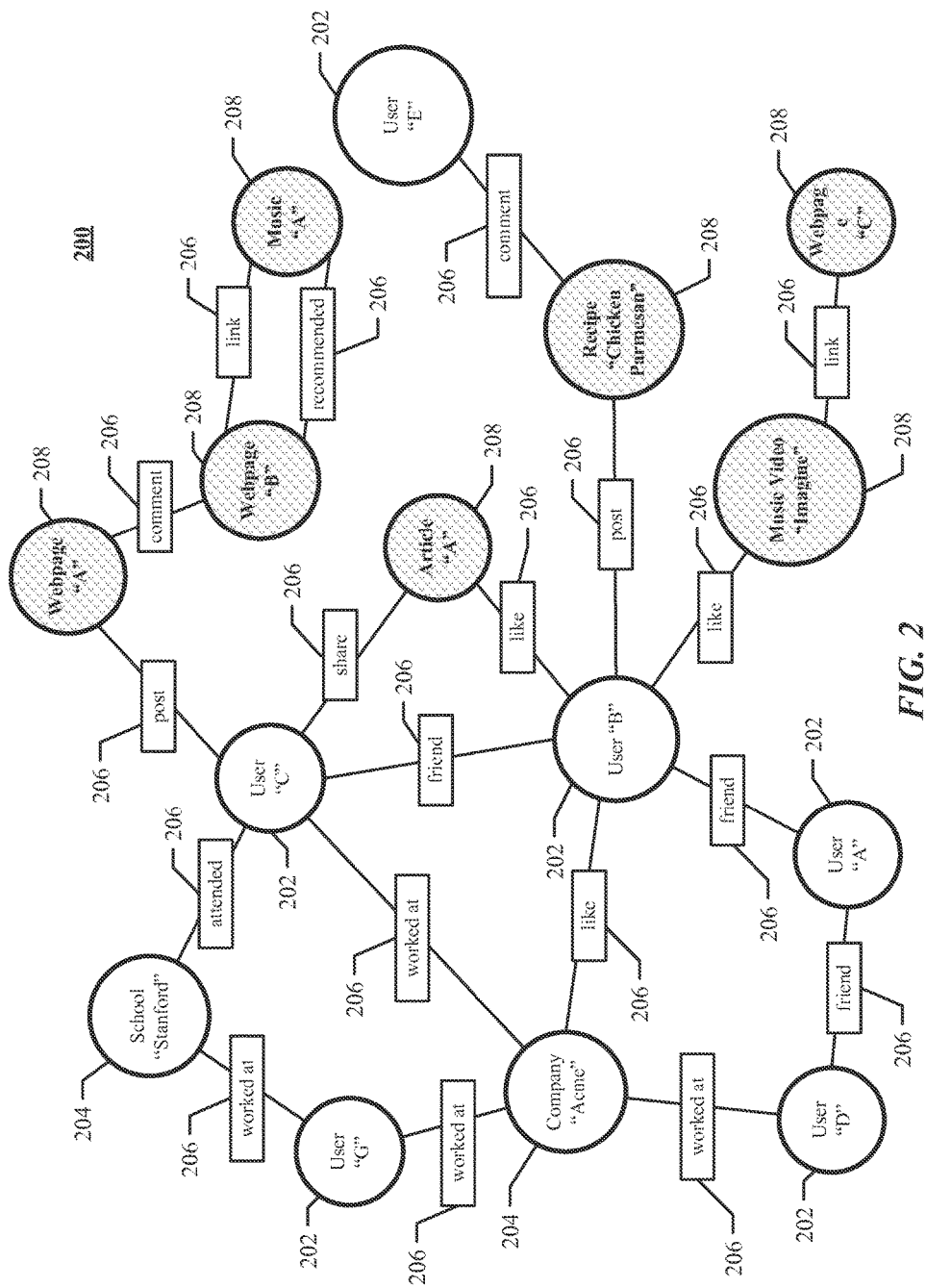
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include user nodes 202, concept nodes 204, and external nodes 208—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept, as represented within the online social network. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file (including posts and comments), structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, the social graph 200 may include one or more external nodes 208. An external node 208 may represent any suitable third-party webpage or resource hosted by third-party system 170. The third-party webpage or resource may be associated with a particular URL, may be a page of a native application provided by the third-party system 170, may be "deep link" to particular content within a third-party application associated with the third-party system 170, or any other type of third-party webpage or resource. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing client system 130 to send to social-networking system 160 a message indicating the user's action. In response to the message, social-networking system 160 may create an edge (e.g., a check-in-type edge) between a user node 202 corresponding to the user and an external node 208 corresponding to the third-party webpage and store edge 206 in one or more data stores. As another example and not by way of limitation, a user may post an internal comment on the online social network (which may correspond to a concept node 204), where the internal comment includes a reference (e.g. a link) to a particular third-party webpage (which may correspond to an external node 208). In response to the user posting this internal comment on the online social network, social-networking system 160 may create an edge 206 between the concept node 204 corresponding to the post and the external node corresponding to the third-party webpage.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request"

to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "worked at," "post" or "comment" a concept, each of which may correspond to an edge type or subtype (note, however, that posts and comments may also correspond to their own concept nodes 204). In the example of FIG. 2, a user-profile page of a user (user "C") may indicate that the user attended Stanford University and worked at company "Acme". As such, social-networking system 160 may create an "attended" edge 206 linking a user node 202 corresponding to user "C" and an concept node 204 corresponding to school "Stanford" to indicate that user "C" attended Stanford University. Moreover, social-networking system 160 may create a "worked at" edge 206 linking the user node 202 corresponding to user "C" and an concept node 204 corresponding to company "Acme" to indicate that user "C" worked at company "Acme". In particular embodiments, an external page corresponding to an external node 208 may include, for example, a comment field. After a user selects a particular default comment or enters one or more comment, social-networking system 160 may create a "comment" edge in response to the user's action.

In particular embodiments, an external page corresponding to an external node 208 may include, for example, a comment field (such as, for example, a text entry box allowing user comments to be inputted and posted on the external page), a selectable "share" icon (such as, for example, a clickable "share" icon), a selectable "post" icon (such as, for example, a clickable "post" icon), a selectable "like" icon (such as, for example, a clickable "like" icon), a selectable "check-in" icon (such as, for example, a clickable "check-in" icon), a selectable "add to favorites" (such as, for example, a clickable "add to favorites" icon), other suitable functionality, or any suitable combination thereof, which may be performed in association with the online social network (e.g., via an API of the online social network). After a user performs one or more of these actions on the external page, social-networking system 160 may create edges 206 in response to the user's actions. As an example and not by way of limitation, a user (user "C") viewing external webpage "A" (such as, for example, by using a web browser or a special-purpose application hosted by the user's client system 130) may post a link or other reference to webpage "A" on the user's profile within social-networking system 160. In this case, social-networking system 160 may update the search index to indicate a connection between webpage "A" and user "C", for example by updating social graph 200 to include a post-type edge 206 between the user node 202 corresponding to user "C" and external node 208 corresponding to webpage "A" to indicate that user "C" posts webpage "A." As another example and not by way of limitation, a user (user "B") viewing article "A" hosted by third-party system 170 online (such as, for example, by using a web browser or a special-purpose application hosted by the user's client system 130) may like the article and share the article with user "C". In this case, social-networking system 160 may create a like-type edge 206 between user node 202 corresponding to user "B" and external node 208 corresponding to the article to indicate that user "B" likes the article. Moreover, social-networking system 160 may create a share-type edge 206 between user node 202 corresponding to user "C" and the external node 208 corresponding to article "A" to indicate that article "A" is shared with user "C." As yet another example and not by way of limitation, a user (user "B") viewing external recipe "Chicken Parmesan" online (such as, for example, by using a web browser or a special-purpose application hosted by the user's client system 130) may post a URL of the recipe in the user's profile within social-networking system 160. In this case, social-networking system 160 may create a post-type edge 206 connecting a user node 202 corresponding to user "B" to an external node 208 corresponding to the recipe to indicate that user "B" posts the URL of the recipe. As yet another example and not by way of limitation, a music video ("Imagine") hosted by third-party system 170 may include a "like" selectable icon. A user (user "B") viewing the third-party music video (such as, for example, by using a web browser or a special-purpose application hosted by the user's client system 130) may perform an action by selecting the "like" icon, causing client system 130 to send to social-networking system 160 a message indicating the user's action. In response to the message, social-networking system 160 may create a like-type edge between the user node 202 corresponding to user "B" and an external node 208 corresponding to the third-party music video ("Imagine") to indicate that user "B" likes the music video. In particular embodiments, social-networking system 160 may store edges 206 in one or more data stores 164, and wherein the edges 206 may be stored as entries in a search index. Although this disclosure describes particular edges 206 with particular attributes connecting user nodes 202, concept nodes 204, and external nodes 208, this disclosure contemplates any suitable edges 206 with any suitable attributes connecting user nodes 202, concept nodes 204, and external nodes 208. Moreover, although this disclosure describes edges between nodes representing a single relationship, this disclosure contemplates edges between nodes representing one or more relationships, as appropriate. As an example and not by way of limitation, an edge 206 may represent both that a user likes and has used at a particular concept. Alternatively, another edge 206 may represent each type of relationship (or multiples of a single relationship) between a user node 202 and a concept node 204.

In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 or external nodes corresponding to those content objects. In particular embodiments, an edge 206 may be automatically formed by social-networking system independent of any users' actions. As another example associated with music video ("Imagine") (as described above) and not by way of limitation, social-networking system 160 may crawl the third-party music video and index a URL associated with a third-party webpage "C" that includes lyrics for the music video ("Imagine"). Thereof, social-networking system 160 may create an external node 208 corresponding to webpage "C" and a link-type edge 206 connecting external nodes 208 corresponding to webpage "C" and music video ("Imagine"). In this case, the link-type edge 206 may indicate that webpage "C" is linked by a URL to music video "Imagine". As another example associated with webpage "A" (as described above) and not by way of limitation, social-networking system 160 may infer webpage "B" in response to the creation of external node 208 corresponding to webpage "A". In particular embodiments, social-networking system 160 may identify external webpage "B" from a comment posted on the online social network by a second user in association with webpage "A", even though webpage "B" may not be associated with user "C". As an example and not by way of limitation, the second user may comment "A reminds me of webpage B!" As an example of FIG. 2 and not by way of limitation, social-networking system 160 may index a URL of the external webpage "B" associated with the comment as posted on the online social network. Thereof, social-networking system 160 may create an external node 208 corresponding to indexed webpage "B". Moreover, social-networking system 160 may create a comment-type edge 206 connecting external nodes 204 corresponding to webpages "A" and "B" to indicate that webpage "B" was inferred from a comment posted in association with webpage "A" on the online social network. As another example of FIG. 2 and not by way of limitation, social-networking system 160 may crawl webpage "B" to identify a URL to music "A". Furthermore, music "A" is recommended by webpage "B". In particular embodiments, music "A" may be hosted by a third-party system 170 that hosts external webpage "B". In particular embodiments, music "A" may be hosted by a different third-party system 170. In these cases, social-networking system 160 may create an external node 208 corresponding to music "A". Moreover, social-networking system 160 may create a "link" edge 206 and a "recommended" edge 206 (as illustrated in FIG. 2) between external nodes 208 corresponding to webpage "B" and music "A". Although this disclosure describes and illustrates particular means for inferring particular relationship between external nodes 208 corresponding to webpages "A" and "B" based on particular comment associated with webpage "A" as posted by a particular user of the online social network, the disclosure contemplates any suitable means for inferring any suitable relationship between any suitable first node and any suitable second node based on any suitable content associated with the first node in any suitable manner. As an example and not by way of limitation, a second node may be inferred from a first node based on any suitable comment or any suitable post associated with the first node but not associated with the originator (a.k.a. a user) of the comment or post. As another example and not by way of limitation, a second node may be inferred from a first node based on one or more social graph tags (e.g., descriptions, text content, or metadata) associated with the first node and posted by a third-party publisher, or stored in a third-party application link to particular content of the first node.

In particular embodiments, social-networking system 160 may infer at least one edge connecting a first node to a second node of the social graph 200 based on term-frequency-inverse-document-frequency (tf-idf) analysis, topic extraction analysis, or sentiment analysis of a content associated with the edge connecting the first node to the second node of the social graph 200. In particular embodiments, social-networking system 160 may parse the content to identify one or more n-grams (as described below) corresponding to one or more keywords associated with the content. Herein, reference to an n-gram may encompass a keyword, or vice-versa, where appropriate. In particular embodiments, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the user. Each n-gram may include one or more parts from the content. In particular embodiments, each n-gram may comprise a character string (e.g., one or more characters of text) entered by the user. As an example and not by way of limitation, a plurality of comments may be posted on the online social network corresponding to a link for an external article "B" that discusses the conflict in Ukraine and social-networking system 160 may parse one of the posted comments "What is Obama going to do about this terrible war" to identify the following n-grams: Obama; terrible; war; Obama terrible; Obama war; terrible war; Obama terrible war. In particular embodiments, social-networking system 160 may use a tf-idf analysis to determine one or more relevant keywords from the n-grams that are related to one or more objects (from social graph 200) associated with the content. As an example and not by way of limitation, a second node may correspond to an URL of the external article "B" and social-networking system 160 may use a tf-idf analysis to determine that "Obama" and "war" are the relevant keywords that are related to the object of the second node (i.e. the external article "B") and the object of the first node (i.e. the user who posts the comment). In particular embodiments, social-networking system 160 may identify an anchor term from the content as received from a user of the online social network. Accordingly, social-networking system 160 may use a topic extraction mechanism or system to identify one or more nodes (i.e. first and second nodes) from social graph 200 that closely match the anchor term. In particular embodiments, social-networking system 160 may infer at least one edge connecting the first and second nodes from social graph 200 from a content associated with the edge using sentiment analysis of the content. As an example and not by way of limitation, social-networking system 160 may infer a sentiment polarity of the user towards a first content (as provided by the user). Thereof, social-networking system 160 may associate the inferred sentiment polarity with any second or subsequent content from the user that is related to the first content. As an example and not by way of limitation, if the user makes a comment on a page he has previously liked, then social-networking system 160 may associate the inferred sentiment polarity (positive sentiment polarity associated with the like) with the comment as well.

Furthermore, the sentiment towards the content may be binary (for example, like or dislike, love or hate, happy or sad) or categorical (for example, enthusiastic, like, neutral, dislike, and disgust) that translates to multiple levels of sentiment. In particular embodiments, the sentiment towards a particular content may be weighted across all related content or just being associated with that particular content. More information on topic extraction may be found in U.S. patent application Ser. No. 13/167,701, filed 23 Jun. 2011, which is incorporated by reference. Furthermore, more information on sentiment analysis may be found in U.S. patent application Ser. No. 14/023,136, filed 10 Sep. 2013, which is incorporated by reference.

As another example and not by way of limitation, referencing the recipe "Chicken Parmesan" (as described above), social-networking system 160 may crawl the online resource recipe and index a user (user "E") who commented the recipe. In particular embodiments, user "E" may correspond to an existing user node 202 of social graph 200. In this case, social-networking system 160 may create a comment-type edge 206 between a user node 202 corresponding to user "E" and external node 208 corresponding to the recipe. As such, social-networking system 160 may indicate that user "E" commented on recipe "Chicken Parmesan." In particular embodiments, user "E" may not correspond to any user nodes 202 of social graph 200. In this case, social-networking system 160 may create a new user node 202 and a user profile associated the user node 202 for user "E". Then social-networking system 160 may create a comment-type edge 206 between the new user node 202 corresponding to user "E" and external node 208 corresponding to the recipe. Although this disclosure describes forming particular edges 206 in particular manners, this disclosure contemplates forming any suitable edges 206 in any suitable manner. Moreover, although this disclosure describes edges between two concept nodes 204 representing a single relationship, this disclosure contemplates edges between two concept nodes 204 representing one or more relationships. As an example and not by way of limitation, an edge 206 may represent both that a first concept recommends and has used a second concept. Alternatively, another edge 206 may represent each type of relationship (or multiples of a single relationship) between a first concept node 204 and a second concept node 204 (as illustrated in FIG. 2 between concept node 208 corresponding to webpage "B" and concept node 208 corresponding to music "A".

Search Queries

In particular embodiments, social-networking system 160 may receive a query from a user of an online social network hosted by social-networking system 160. A user may submit a query to social-networking system 160 by inputting text into a query field. A user of an online social network may search for information relating to a specific subject matter (e.g., users, concepts, external content or resources) by providing one or more keywords or a short phrase describing the subject matter, often referred to as a "search query," to a search engine associated with social-networking system 160. The query may be an unstructured text query and may comprise one or more text strings (which may include one or more n-grams). As used herein, an unstructured text query refers to a simple text string inputted by a user. In general, a querying user may input any suitable character string into a query field to search for content on social-networking system 160 that matches the text query. Although this disclosure describes querying social-networking system 160 in a particular manner, this disclosure contemplates querying social-networking system 160 in any suitable manner.

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into a query field. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me))", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. Each n-gram may include one or more parts from the text query received from the querying user. In particular embodiments, each n-gram may comprise a character string (e.g., one or more characters of text) entered by the first user. As an example and not by way of limitation, social-networking system 160 may parse the text query "friends stanford" to identify the following n-grams: friends; stanford; friends stanford. Although this disclosure describes parsing particular queries in a particular manner, this disclosure contemplates parsing any suitable queries in any suitable manner.

In particular embodiments, objects may be indexed by one or more search indices. The search indices may be hosted by respective index server comprising one or more computing devices (e.g., servers). The index server may update the search indices based on data (e.g., a photo and information associated with a photo) submitted to social-networking system 160 by users or accessed by other processes of social-networking system 160 (or a third-party system 170). In a traditional search engine, a web crawler may "scrape" a webpage and fetch content within the webpage. If the first webpage has links to other webpages, the search engine may infer that the first webpage is somehow related to the linked webpages, and thus update the respective search indices. A document processor may then generate snippets of the content from the webpage that can be presented as part of a search result, and from the fetched content, determine the properties of the webpage in the search index. In particular embodiments, social-networking system 160 may generate an enhanced search index that also contains properties of the external webpages that are not in the fetched content for the webpage, but are in content in links, posts, comments, etc., associated with the online social network that are related to the external webpage or resource. As an example and not by way of limitation, a user may create a post on the online social network that includes a link to an external webpage "A." The user may add additional text "B" in the post, which may or may not overlap with the content of the linked webpage "A" (e.g. the webpage could contain content "C", and the user could post the link saying "Check this out! it reminds me of D"). The posting user or other users of the SN may additionally comment on the original post. Those comments may also contain content that was not in webpage "A." (e.g. in the example above, another user may comment, "D? It's more like E!"). In this example, webpage "A" would now be associated in the search index with a union of terms T1∪T2∪T3, where T1 is the content in webpage "A", T2 is the content "B" in the internal post on the online social network containing the link to the external webpage, and T3 is the content in the internal comments on the online social network to the post "B" containing the link. The combined set of content would then be scraped by the search engine of the online social network and processed into the search index as described above. As another example and not by way of limitation, a user may create a comment on the online social network that includes a link to an external article "B" that discusses the conflict in Ukraine but does not mention "Obama" explicitly. However the comment may mention Obama (as an example, "What is Obama going to do about this terrible war"). As described above, article "B" would now be associated in the search index with the comment that mentions Obama. In particular embodiments, comments used for enhancing the search index (i.e. associating with a particular node of social graph 200) may include comments posted on the online social network or comments posted on third-party system 170 using an application programming interface (API) or software development kit (SDK). As an example and not by way of limitation, the API or SDK may include a social plugin that is integrated with the online social network. In particular embodiments, the index server may also update the search indices periodically (e.g., every 24 hours). The index server may receive a query comprising a search term, and access and retrieve search results from one or more search indices corresponding to the search term. In some embodiments, a data store corresponding to a particular object-type may comprise a plurality of physical or logical partitions, each comprising respective search indices. More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/877,049, filed 3 May 2013, each of which is incorporated by reference.

In particular embodiments, in response to a query from a user, social-networking system 160 may identify a set of objects associated with an online social network hosted by social-networking system 160 that substantially match the query. In particular embodiments, social-networking system 160 may search one or more search indices on one or more data stores 164 (or, in particular embodiments, a social-graph database) to identify objects matching the query. In particular embodiments, a search engine associated with social-networking system 160 may conduct a search based on the query phrase using various search algorithms and identify objects (e.g., user-profile pages, content-profile pages, or external pages, content, or resources) that substantially match the search query. In particular embodiments, a search algorithm may be based on social-graph elements referenced in the search query, terms within the search query, user information associate with the querying user, search history of the querying user, pattern detection, other suitable information related to the query or the user, or any combination thereof. As an example and not by way of limitation, referencing FIG. 2, in response to a search query from a user, social-networking system 160 may identify webpage "A" as a matching object. In this case, the identified objects matching the query may encompass any suitable content of external node 208 corresponding to webpage "A", any suitable content of the post-type edge 206 associated with the external node 208, any suitable content of the comment-type edge 206 connecting the external nodes 208 for webpage "A" and webpage "B", and any suitable content associate with the external node 208 corresponding to webpage "B". In particular embodiments, the identified objects may be associated in a search index with a union of terms T1∪T2∪T3∪T4 where T1, T2, T3, and T4 correspond to any suitable content of webpage "A", any suitable content of "post" edge 206, any suitable content of "comment" edge 206, and any suitable content of webpage "B" respectively, as discussed above.

In particular embodiments, the resources, objects, or content identified by social-networking system 160 in response to a search query may include, for example, social-graph elements (i.e., user nodes 202, concept nodes 204, edges 206), profile pages (or content of profile pages), posts, comments, messages, event listings, user groups, news stories, headlines, instant messages, chat room conversations, emails, advertisements, coupons, pictures, video, music, external webpages, other suitable objects, or any suitable combination thereof. Although this disclosure describes particular types of identified objects, this disclosure contemplates any suitable types of identified objects. In particular embodiments, the search engine may limit its search to resources, objects, or content on the online social network. However, in particular embodiments, the search engine may also search for resources or contents on other sources, such as third-party system 170, the internet or World Wide Web, or other suitable sources. Although this disclosure describes identifying particular objects in response to a search query in a particular manner, this disclosure contemplates identifying any suitable objects in response to a search query in any suitable manner.

In particular embodiments, after identifying a set of objects associated with a query, social-networking system 160 may score each identified object. In particular embodiments, the identified objects may be scored or ranked based on one or more scoring/ranking algorithms. As an example and not by way of limitation, objects that are more relevant to the search query or to the user may be scored higher than objects that are less relevant. In particular embodiments, social-networking system 160 may select one or more of the identified objects based on the scoring/ranking of the objects, for example, by selecting one or more objects having a score or rank greater than threshold score or rank. The scoring/ranking process may enhance search quality by identifying high-quality objects to use as search results. In particular embodiments, social-networking system 160 may generate one or more search results corresponding to the selected objects, and in response to the query, social-networking system 160 may send one or more of the search results (e.g., as a search-results page comprising references to the selected objects) for display to the user.

In particular embodiments, a typeahead process may be applied to search queries entered by a user. As an example and not by way of limitation, as a user enters text characters into a query field, a typeahead process may attempt to identify (e.g., by accessing one or more search indices) one or more social graph elements (e.g., user nodes 202, concept nodes 204, external nodes 208, or edges 206) that match the string of characters entered into the query field as the user is entering the characters. As the typeahead process receives requests or calls including a string or n-gram from the text query, the typeahead process may perform or cause to be performed a search to identify existing social-graph elements having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays references to the matching profile pages (e.g., a name or photo associated with the page) of the respective user nodes 202, concept nodes 204, or external nodes 208, and displays names of matching edges 206 that may connect to the matching nodes, which the user can then click on or otherwise select, thereby confirming the desire to search for the matched object corresponding to the selected node, or to search for objects connected to the matched users, concepts, or external objects by the matching edges. Alternatively, the typeahead process may simply auto-populate a field or form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and/or edges, the typeahead process may send a request that informs social-networking system 160 of the user's confirmation of a query containing the matching social-graph elements. In response to the sent request, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, and U.S. patent application Ser. No. 12/978,265, filed 23 Dec. 2010, each of which is incorporated by reference.

Ranking External Content

In particular embodiments, in response to a search query from a user of the online social network, social-networking system 160 may identify external content objects associated with third-party systems that substantially matches the query. External objects may be identified by accessing an enhanced search index, as discussed above. As an example and not by way of limitation, the enhanced search index may incorporate internal data collected by the social-networking system 160 about the external object, such as posts, links, shares, comments, etc., on the online social network with respect to the external object. In particular embodiments, social-networking system 160 may consider the source from which it determined that there is a link between an external object and another online document; for example, the association could be in the original webpage, in a link post, in comments to a link post, through a third-party API, etc. The different sources may be associated with different signal strengths for ranking purposes. In particular embodiments, social-networking system 160 may collect data on impressions, which represents the number of users who have viewed a particular webpage, link, post, comment, etc. Social-networking system 160 may also measure the number of interactions after a user has seen the webpage, e.g. the click-through rate, and augment that with social interactions, e.g., likes, shares, comments, etc. on the online social network. In particular embodiments, social-networking system 160 may then send a search-results page comprising references to one or more of the identified objects for display to the first user. Each referenced object in the search-results page having a score or rank greater than a threshold score. Although this disclosure describes identifying and scoring particular external objects in a particular manner, this disclosure contemplates identifying and scoring any suitable external objects in any suitable manner.

FIG. 3 illustrates an example set of objects identified in response to a query. In particular embodiments, in response to a search query, social-networking system 160 may identify any suitable number of objects that substantially match the query (e.g., N=10, 100, 1000, etc.). In the example of FIG. 3, each object of object_1 through object_N corresponds to an object identified by social-networking system 160 as likely to be related to a search query. In particular embodiments, social-networking system 160 may score or rank each of the identified objects based on a variety of factors or criteria, which may be referred to as "signals" or "scoring signals." In particular embodiments, social-networking system 160 may calculate, for each identified object, one or more scores corresponding to one or more scoring signals, respectively. In FIG. 3, each identified object of the set of N identified objects is scored across k scoring signals (i.e., signal_1 through signal_k). As an example, object_1 in FIG. 3 is associated with scores $score_1(1)$ through $score_1(k)$, and each score is associated with a particular signal. For example, $score_1(2)$ in FIG. 3 is associated with object_1 and scoring signal signal_2. In particular embodiments, each scoring signal may be associated with a particular criteria used to calculate a score. As an example and not by way of limitation, a score associated with a particular scoring signal may be determined based on social-graph information (such as, for example, degree of separation between social-graph nodes, social-graph affinity, or social relevance, each of which may be its own signal), impressions, interactions, recency, topic relevance, author quality, text similarity, popularity, proximity, a user's search history, or other suitable criteria, or any suitable combination thereof. In particular embodiments, for a set of identified objects scored with respect to a plurality of scoring signals, each signal may use a different ranking or scoring model to score objects. As an example and not by way of limitation, a first signal may score objects based on recency, while a second signal may score objects based on author quality. Although this disclosure describes and illustrates particular scoring signals associated with particular criteria used to determine scores, this disclosure contemplates any suitable scoring signals associated with any suitable criteria used to determine scores.

In particular embodiments, social-networking system 160 may access a social graph 200 comprising a plurality of nodes and a plurality of edges 206 connecting the nodes, each of the edges 206 between two of the nodes representing a single degree of separation between them. In particular embodiments, a querying user may correspond to a particular user node 202 of a social graph 200, and each identified object may correspond to a particular node of a social graph 200. In particular embodiments, for each identified object, a score corresponding to a particular scoring signal may be based at least in part on social-graph information associated with a querying user and the identified object. As an example and not by way of limitation, a score corresponding to a particular scoring signal may be based at least in part on a degree of separation between the user node 202 of the querying user and an external node 208 corresponding to the identified object. Objects that reference social-graph elements that are closer in the social graph 200 to the querying user (i.e., fewer degrees of separation between the element and the querying user's user node 202) may be scored or ranked more highly than objects that are further from the user (i.e., more degrees of separation). In the example of FIG. 2, user nodes 202 of user "A" and user "B" have a single degree of separation, and user nodes 202 of user "B" and user "E" have two degrees of separation. Based on the degrees of separation, a degree-of-separation score for user "B" with respect to user "A" may be higher than a score for user "B" with respect to user "E." As another example and not by way of limitation, a comment corresponding to a concept node 204 that is closer in the social graph 200 to the querying user (i.e., fewer degrees of separation between the concept node 204 and the querying user's user node 202) may be scored or ranked more highly than concept nodes 204 that are further from the querying user's user node 202 (i.e., more degrees of separation). Although this disclosure describes scoring objects based on degree of separation in a particular manner, this disclosure contemplates scoring objects based on degree of separation in any suitable manner. Furthermore, although this disclosure describes and illustrates particular scoring signals based on particular social-graph information, this disclosure contemplates any suitable scoring signals based on any suitable social-graph information.

In particular embodiments, for each identified object, a score corresponding to a particular scoring signal may be based at least in part on a social-graph affinity associated with the querying user (or the user node 202 of the querying user) with respect to the identified object (or a node associated with the identified object). As an example and not by way of limitation, in response to a query "Photos of my friends," social-networking system 160 may determine that the search intent of this query is to view internal and external photos showing the user's friends. When scoring identified external nodes 208 corresponding to photos with the user's friends identified in the photo, social-networking system 160 may score external photos based on the social-graph affinity (e.g., as measured by an affinity coefficient) of the users identified in the photo with respect to the querying user. Furthermore, external photos showing more of the querying user's friends may have a higher affinity score than photos showing fewer of the user's friends, since having more friends identified in the photo may increase the querying user's affinity with respect to that particular photo. As another example and not by way of limitation, in response to a query from a user <Mark>, social-networking system 160 may identify a set of objects that includes users <Tom>, <Dick>, and <Harry>. Social-networking system 160 may then score the users <Tom>, <Dick>, and <Harry> based on their respective social affinity with respect to the querying user <Mark>. For example, social-networking system 160 may score the identified nodes of users <Tom>, <Dick>, and <Harry> based in part on a number of posts authored by those users and liked by the user <Mark>. If user <Dick> authored three posts that were liked by the user <Mark>, user <Tom> authored two posts liked by <Mark>, and user <Harry> authored one post like by <Mark>, social-networking system 160 may score user <Dick> as highest with respect to an affinity-score signal since he authored most of the posts liked by the user <Mark>, with <Tom> and <Harry> having consecutively lower scores. Although this disclosure describes scoring objects based on affinity in a particular manner, this disclosure contemplates scoring objects based on affinity in any suitable manner.

In particular embodiments, for each identified object, a score corresponding to a particular scoring signal may be based at least in part on a social relevance of the identified object to the querying user. Objects that reference social-graph elements that are more closely connected or otherwise relevant to the querying user may be scored more highly than objects that reference social-graph elements that are not as closely connected or are otherwise less relevant to the querying user. As an example and not by way of limitation, the social relevance of a particular external node 208 may be based on the number of edges 206 connected to the external node 208, such that an object referencing an external node 208 connected by more edges 206 may be scored or ranked higher than another object referencing another external node 208 connected by fewer edges 206. As another example and not by way of limitation, the social relevance of a particular edge 206 or edge-type may be based on the frequency of that edge-type being connected to particular nodes. In particular embodiments, identified objects associated with social-graph elements that the querying user has previously accessed, or are relevant to the social-graph elements the querying user has previously accessed, may be more likely to be the target of the querying user's search query. Thus, these identified objects may be scored or ranked more highly. As an example and not by way of limitation, in response to a text query for "stanford", if the querying user has previously visited the "Stanford University" webpage (stanford.edu) but has never visited the "Stanford, Kentucky" webpage (stanfordky.org), when determining the score or rank for objects referencing these concepts, social-networking system 160 may determine that the object referencing the concept node 204 for "Stanford University" has a relatively high social-relevance score or rank because the querying user has previously accessed the concept node 204 for the school. In particular embodiments, social-networking system 160 may score or rank identified objects based at least in part on advertising sponsorship. An advertiser (such as, for example, the user or administrator of a particular profile page corresponding to a particular node) may sponsor a particular node such that an object associated with that node may be scored or ranked more highly. Although this disclosure describes scoring objects based on social relevance in a particular manner, this disclosure contemplates scoring objects based on social relevance in any suitable manner. Moreover, although this disclosure describes scoring search results based on social-graph information in a particular manner, this disclosure contemplates scoring search results based on social-graph information in any suitable manner.

In particular embodiments, for each identified object, a score corresponding to a particular scoring signal may be based at least in part on a recency value associated with the identified object. In particular embodiments, a recency value may correspond to how recently an associated object was generated, created, posted, sent, received, viewed, or commented on. For example, a recency value associated with an identified object may be determined based on a time or date associated with the object compared with the current time or date. Objects associated with more recent dates may have higher recency-value scores than objects associated with dates further in the past. As an example and not by way of limitation, an identified object corresponding to a comment that was posted two days ago may have a relatively high recency-value score (e.g., 9 out of 10), while another identified object corresponding to another comment that was posted a year ago may have a relatively low recency-value score (e.g., 2 out of 10). In particular embodiments, a recency value may correspond to a time or date associated with a future event or activity, and an event occurring sooner in the future may have a higher recency-value score than an event happening further in the future. As an example and not by way of limitation, an identified object corresponding to a party happening tomorrow may have a higher recency-value score than another identified object corresponding to a concert happening two weeks in the future. Although this disclosure describes scoring objects based on recency values in a particular manner, this disclosure contemplates scoring objects based on recency values in any suitable manner.

In particular embodiments, for each identified object, a score corresponding to a particular scoring signal may be based at least in part on a calculated topic relevance for the identified object with respect to a query or with respect to a querying user. As an example and not by way of limitation, a querying user may have liked, subscribed to, or searched for objects associated with particular topics or subject matters in the past. An identified object associated with a topic a user has previously liked or searched for in social graph 200 may receive a higher topic-relevance score than another identified object associated with a topic having less relevance to the querying user. For example, a user may have subscribed to a scuba-diving discussion group in the online-social network, and if the user submits a query for external webpages related to vacations in the Caribbean, identified objects corresponding to external webpages associated with scuba diving in the Caribbean may have a higher topic-relevance score than other identified objects corresponding to other external webpages related to vacations in the Caribbean. As another example and not by way of limitation, an identified object associated with a trending or popular topic may have a higher topic-relevance score than another identified object associated with a less-popular topic. Although this disclosure describes scoring objects based on topic relevance in a particular manner, this disclosure contemplates scoring objects based on topic relevance in any suitable manner.

In particular embodiments, for each identified object, a score corresponding to a particular scoring signal may be based at least in part on a calculated author quality associated with the identified object. An identified object may have a higher author-quality score if it is associated with a popular author, while another identified object associated with a less popular author may have a lower author-quality score. In particular embodiments, an author-quality score may be based in part on a number of "likes" or views an author has received or a measure of the author's global popularity on the online social network. In particular embodiments, an author-quality score may be based in part on a number of connecting edges 206 to nodes associated with a particular author. For example, an author associated with nodes having more connecting edges 206 may be more popular and may have a higher author-quality score than another author associated with nodes having fewer connecting edges 206. In particular embodiments, an author-quality score may be based in part on an author's popularity with respect to the querying user or friends of the querying user. For example, an identified object corresponding to a third-party multimedia content associated with an author who has received a greater number of "likes" from friends of a querying user may receive a higher author-quality score than another author who has received fewer "likes" from friends of the querying user. Although this disclosure describes scoring objects based on author quality in a particular manner, this disclosure contemplates scoring objects based on author quality in any suitable manner.

In particular embodiments, for each identified object, a score corresponding to a particular scoring signal may be based at least in part on a calculated text similarity between the identified object and a query. The text similarity or textual relevance of a query may be based on how the terms (e.g., n-grams) and number of terms in the query match to text associated with an identified object. In particular embodiments, a text-similarity score may be based on matches between a query and words or phrases associated with an identified object (e.g., summary, subject, title, author, keywords, or body of text associated with an identified object). In particular embodiments, a text-similarity score may be based on a number of text matches between a query and text associated with an identified object. As an example and not by way of limitation, an identified object that includes 80% of the terms of a query may have a higher text-similarity score than another identified object that includes 50% of the terms. As another example and not by way of limitation, if a user submits a query "Hawaii bike rides," a comment that includes the phrase "bike rides in Hawaii" may have a relatively high text-similarity score (e.g., 10 out of 10), while a comment that includes the phrase "bike-riding vacations" may have a lower text-similarity score (e.g., 6 out of 10). In particular embodiments, a text-similarity score may be based on a number of times text from a query occurs in text associated with an identified object. For example, if a user submits a query "coffee shops in San Francisco," an identified object that includes the terms "coffee" or "coffee shop" 50 times may have a higher text-similarity score than another identified object that includes "coffee" 10 times. Although this disclosure describes scoring objects based on text similarity in a particular manner, this disclosure contemplates scoring objects based on text similarity in any suitable manner.

In particular embodiments, for each identified object, a score corresponding to a particular scoring signal may be based at least in part on a number of impressions and/or interactions associated with the identified object. An impression may describe a total number of users who have viewed the identified object. As an example and not by way of limitation, an identified object may correspond to a third-party webpage and an impression of the third-party webpage may describe a number of users associated with social-networking system 160 who have viewed the third-party webpage. An interaction may be associated with a share, a like, a comment, or a re-share of the identified object by users of social-networking system 160. Furthermore, an interaction may be associated with a share, a like, a comment, or a re-share of the identified object by a user after the user has viewed the identified object. In particular embodiments, for each identified object, a score corresponding to a particular scoring signal may be based at least in part on a ratio of a total number of interactions for the identified object (as described above) to a number of impressions for the identified object. As an example and not by way of limitation, an external node 208 corresponding to a first third-party webpage that was viewed by thousands of users and commented on by five users may be scored lower than an external node 208 corresponding to a second third-party webpage that was viewed by a dozen users but commented on ten times. Although this disclosure describes scoring objects based on impressions and interactions in a particular manner, this disclosure contemplates scoring objects based on any suitable impressions and any suitable interactions in any suitable manner.

FIG. 4 illustrates an example set of objects identified in response to a query. In the example of FIG. 4, the seven identified objects (object_1 through object_7) are scored with respect to four scoring signals (impressions, interaction/impressions, text similarity, and social relevance). Although this disclosure describes and FIG. 4 illustrates scoring identified objects with respect to particular types and particular numbers of scoring signals, this disclosure contemplates scoring identified objects with respect to any suitable types and any suitable numbers of scoring signals. The scores in FIG. 4 are in a range or scoring scale from 0 to 10, where a minimum score of 0 represents little or no match or similarity between an object and a scoring signal and a maximum score of 10 represents a good or perfect match between an object and a scoring signal. In particular embodiments, scores associated with a particular scoring signal may be associated with a particular scoring scale or range. As an example and not by way of limitation, scores may be calculated on a scale or range of 0 to 1, 1 to 5, 0% to 100%, 100 to 1000, or on any suitable scoring scale. In particular embodiments, scores associated with a particular scoring signal may not have any particular or fixed scoring scale or may be scored according to an arbitrary scoring scale. In particular embodiments, scores associated with two different scoring signals may have the same scoring scale or may have different scoring scales. In particular embodiments, scores associated with a particular scoring signal may be calculated on an initial scoring scale, and then the scores may be normalized or mapped to another scoring scale. As an example and not by way of limitation, scores for a particular scoring signal may have an initial range of 100 to 500, and those scores may be normalized to a scoring scale with a range of 0 to 10 or 0% to 100%. One or more of the scoring signals may then be used to calculate a score and/or rank for the identified object. In particular embodiments, after identifying and calculating scores for a set of objects that substantially match a user's query, social-networking system 160 may select one or more of the identified objects from the set based on the calculated scores. As an example and not by way of limitation, objects having greater than a threshold score or rank may be selected for inclusion in the search results sent to the querying user. Although this disclosure describes and FIG. 4 illustrates particular scores associated with particular scoring scales, this disclosure contemplates any suitable scores associated with any suitable scoring scales.

In connection with scoring identified objects in response to a query, particular embodiments may utilize one or more systems, components, elements, functions, methods, operations, or steps disclosed in U.S. patent application Ser. No. 14/304,596, filed 13 Jun. 2014, which is incorporated by reference.

Generating and Sending Search Results

In particular embodiments, social-networking system 160 may generate one or more search results corresponding to one or more of the identified objects, respectively, each search result including a reference to a corresponding identified object. The search results can be sorted in any suitable order (e.g., chronologically or by a ranking score) and then presented to the user. The search results (e.g., the identified nodes or their corresponding profile pages) may be scored (or ranked) and presented to the user according to their relative degrees of relevance to the search query, as determined by the particular search algorithm used to generate the search results. The search results may also be scored and presented to the user according to their relative degree of relevance to the user. The search results may be scored or ranked based on one or more factors (e.g., impressions, interactions, match to the search query or other query constraints, social-graph affinity, search history, etc.), and the top 5, 10, 20, 50, or any suitable number of results may then be generated as search results for presentation to the querying user. In particular embodiments, social-networking system 160 may only send search results corresponding to identified objects having a score/rank over a particular threshold score/rank. As an example and not by way of limitation, social-networking system 160 may only send the top ten results back to the querying user in response to a particular search query. Although this disclosure describes generating particular search results in a particular manner, this disclosure contemplates generating any suitable search results in any suitable manner.

In particular embodiments, social-networking system 160 may send, responsive to the query, one or more search results for display to the querying user. The search results may be sent to the user, for example, in the form of a list of links on a search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. Social-networking system 160 may then send the search-results webpage to the web browser 132 on the user's client system 130. The user may then click on the URL links or otherwise select the content from the search-results webpage to access the content from social-networking system 160 or from an external system (such as, for example, third-party system 170), as appropriate. In particular embodiments, each search result may include a link to a profile page and a description or summary of the profile page (or the node corresponding to that page). The search results may be presented and sent to the querying user as a search-results page.

In particular embodiments, a search result may include one or more snippets. A snippet is contextual information about the target of the search result. In other words, a snippet provides information about that page or content corresponding to the search result. As an example and not by way of limitation, a snippet may be a sample of content from the profile page (or node) corresponding to the search result. The information provided in a snippet may be selected by the owner/administrator of the target page, or may be selected automatically be the social-networking system 160. Snippets may be used to display key information about a search result, such as image thumbnails, summaries, document types, page views, comments, dates, authorship, ratings, prices, or other relevant information. In particular embodiments, a snippet for a search result corresponding to users/concepts in an online social network may include contextual information that is provided by users of the online social network or otherwise available on the online social network. As an example and not by way of limitation, a snippet may include one or more of the following types of information: privacy settings of a group; number of members in a group; sponsored messages (e.g., an inline ad unit rendered as a snippet); page categories; physical address; biographical details; interests; relationship status; sexual orientation/preference; sex/gender; age; birthday; current city; education history; political affiliations; religious beliefs; work history; applications used; comments; tags; other suitable contextual information; or any combination thereof. In particular embodiments, a snippet may include references to nodes or edges from the social graph 200. These snippets may be highlighted to indicate the reference corresponds to a social-graph element. In particular embodiments, a snippet may include content from a third-party webpage or resource. As an example and not by way of limitation, an identified object may correspond to a third-party webpage and the associated snippet may comprise selected relevant text associated from the third-party webpage. In particular embodiments, an identified object may correspond to a comment or a post associated with an edge 206 and the associated snippet may comprise selected relevant text associated with the comment or post. In particular embodiments, an identified object may correspond to an external node 208 and the associated snippet may comprise selected relevant texts associated with an edge 206 of the external node 208. As an example of and not by way of limitation, social-networking system 160 may receive a search query for "Obama," and in response identify webpage "A" corresponding to a third-party webpage that does not contain the keyword "Obama" or otherwise directly reference Obama. Instead, social-networking system 160 may identify the third-party webpage by inference from a comment on post about webpage "A" on the online social network, where the comment reads "This is all Obama's fault" and the comment is posted by a friend of the querying user. In this case, social-networking system 160 may include a snippet "10 users have liked the comment 'This is all Obama's fault'" on webpage "A" by friend "C". In particular embodiments, social-networking system 160 may include the source of the identified object in the snippet. In particular embodiments, the snippet may explicitly state that the identified object is due to other user's post or comment. In particular embodiments, a source of the snippets may be determined by social-networking system 160 or a user of the social-networking system 160. Although this disclosure describes particular types of snippets, this disclosure contemplates any suitable types of snippets. In connection with search results and snippets particular embodiments may utilize one or more systems, components, elements, functions, methods, operations, or steps disclosed in U.S. patent application Ser. No. 13/731,939, filed 31 Dec. 2012, which is incorporated by reference.

Figure 5:
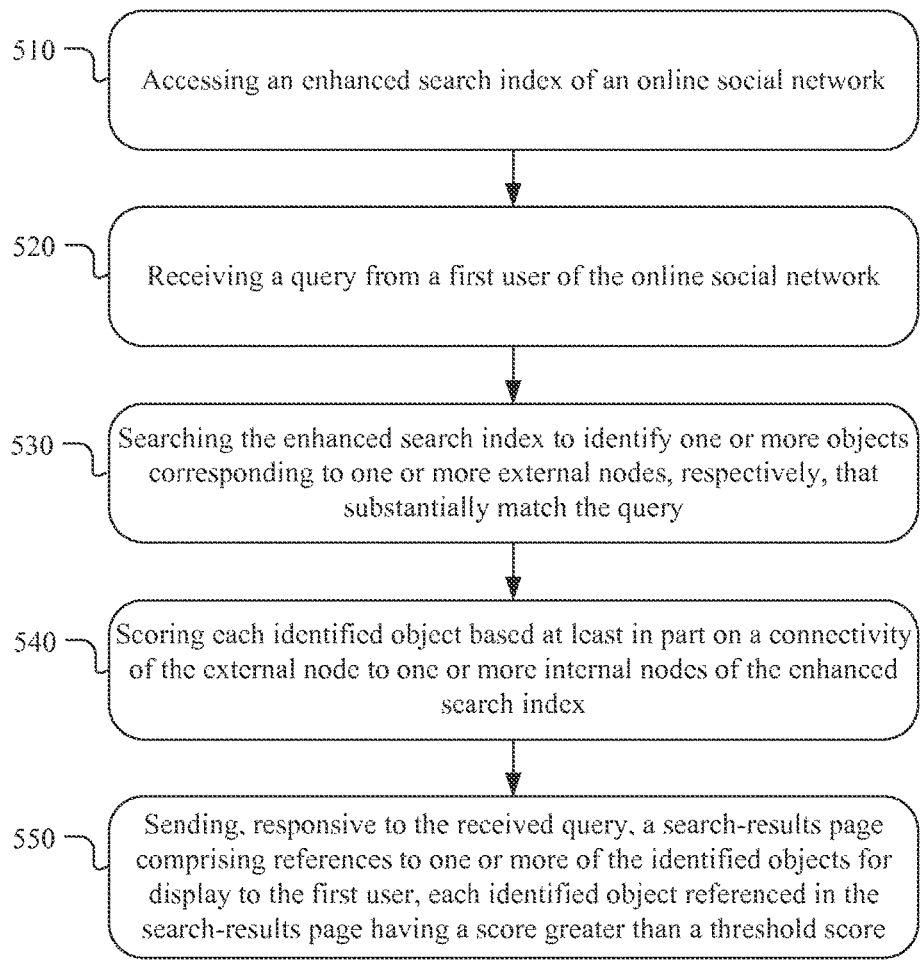
FIG. 5 illustrates an example method for searching and ranking external objects.

FIG. 5 illustrates an example method for searching and ranking external objects. The method may begin at step 510, where social-networking system 160 may access an enhanced search index associated with an online social network. In particular embodiments, the enhanced search index may comprise a social graph 200 comprising a plurality of nodes (e.g., user nodes 202, concept nodes 204, and external nodes 208) and a plurality of edges 206 connecting the nodes. Each edge between two nodes may represent a single degree of separation between them. The nodes may comprise a first node (e.g., a first user node 202) corresponding to a first user associated with the online social network. The nodes may also comprise a plurality of internal nodes that each corresponds to a concept or a second user associated with the online social network, as described above. The nodes may also comprise a plurality of external nodes that each corresponds to a concept associated with a third-party system, as described above. In particular embodiments, each external node may be connected to one or more internal nodes by one or more edges, as described above. At step 520, social-networking system 160 may receive a query from the first user of the online social network. At step 530, social-networking system 160 may search the enhanced search index to identify one or more objects corresponding to one or more external nodes of the plurality of external nodes that substantially match the query. At step 540, social-networking system 160 may calculate, for each identified object, a score based at least in part on a connectivity of the external node to the one or more internal nodes, as described above. In particular embodiments, a plurality of scores corresponding to a plurality of scoring signals may be calculated for each identified object, respectively. At step 550, social-networking system 160 may send a search-results page comprising references to one or more of the identified objects for display to the first user. Each identified object referenced in the search-results page may having a score greater than a threshold score. In particular embodiments, each identified object may have a score greater than the threshold score. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for searching and ranking external objects in response to a query including the particular steps of the method of FIG. 5, this disclosure contemplates any suitable method for searching and ranking external objects in response to any suitable query including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 6:
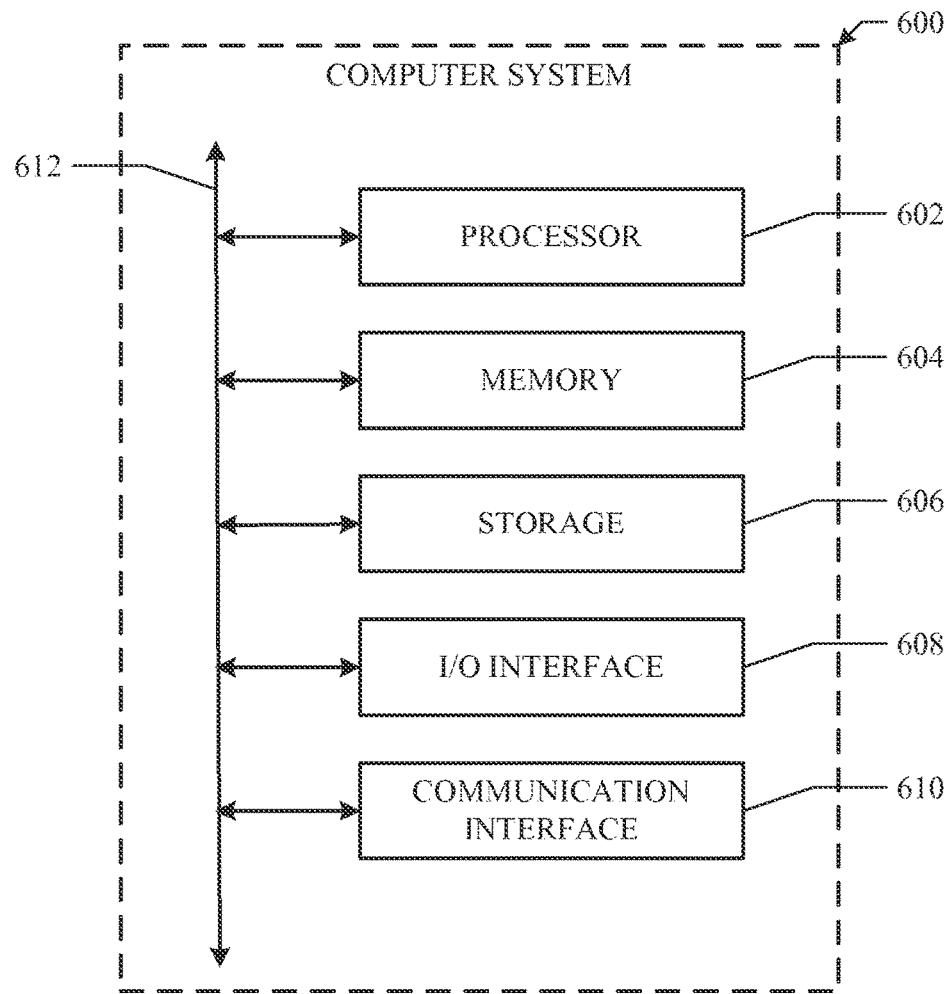
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. As an example and not by way of limitation, the functionality may be associated with one or more software components of a search engine. In particular embodiments, the software components may include a web crawler, a document processor, an index generator, and a snippet generator. As an example and not by way of limitation, the search engine may use the web crawler to fetch web content associated with internal and external concepts. In particular embodiments, the internal concepts are associated with social-networking system 160, as described above. In particular embodiments, the external concepts are associated with third-party system 170, as described above. The web crawler may discover and fetch URLs. As another example and not by way of limitation, the search engine may use the document processor to process content provided by the web crawler for indexing. In particular embodiments, processing the provided content may include adjusting the provided content such that the provided content conforms to relevant formats and forms associated with the index generator. As another example and not by way of limitation, the search engine may use the index generator to generate an index based on the provided content. In particular embodiment, the search engine may gather related provided content prior to indexing. As yet another example and not by way of limitation, the search engine may use the snippet generator to create a snippet for each object associated with a generated index. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:
   accessing, by the one or more computing devices, an enhanced search index of the online social network comprising data from a social graph having a plurality of nodes and a plurality of edges connecting the nodes, each of the edges between two of the nodes representing a single degree of separation between them, the nodes comprising:
    a first node corresponding to a first user associated with the online social network;
    a plurality of internal nodes corresponding to a plurality of internal content objects and a plurality of second users associated with the online social network, each internal content object comprising user-generated content; and
    a plurality of external nodes corresponding to a plurality of external content objects, respectively, each of the external nodes being connected to at least one or more of the internal nodes by at least one edge, each of the external nodes being associated with the content of the one or more internal content objects corresponding to the internal nodes connected to the external node, and each external content object comprising content and being stored on a third-party system separate from and external to the online social network;
receiving, at the one or more computing devices, a query from a client system of the first user, wherein the query comprises one or more keywords;
searching, by the one or more computing devices, the content in the enhanced search index associated with each external node of a plurality of external nodes to identify one or more external content objects corresponding to one or more external nodes, respectively, of the plurality of external nodes that are connected to internal nodes corresponding to internal content objects comprising user-generated content that matches the query, wherein the content of one or more of the external content objects does not match the one or more keywords of the query;
scoring, by the one or more computing devices, each identified external content object based at least in part on: (1) a text similarity between the content of the identified external content object and the query and, (2) a connectivity of the external node corresponding to the identified external content object to the one or more connected internal nodes; and
sending, by the one or more computing devices to the client system responsive to the received query, instructions for presenting a search-results interface comprising references to one or more of the identified external content objects for display to the first user, each identified external content object referenced in the search-results interface having a score greater than a threshold score.

2. The method of claim 1, wherein at least one of the internal nodes is provided by a user of the online social network.

3. The method of claim 1, wherein at least one of the external nodes is generated by crawling, by the online social network, the third-party system.

4. The method of claim 1, wherein at least one edge associated with the external nodes is crawled by the online social network.

5. The method of claim 1, wherein at least one identified external content object is provided by a user of the online social network.

6. The method of claim 1, wherein at least one identified external content object is a webpage hosted by the third-party system.

7. The method of claim 1, wherein at least one identified external content object is a multimedia content object.

8. The method of claim 1, wherein at least one edge connecting an external node to an internal node is created by the online social network in response to an explicit action, the explicit action indicating a relationship between the external node and the internal node.

9. The method of claim 8, wherein the internal node corresponds to a user of the online social network and the explicit action is initiated by the user.

10. The method of claim 1, wherein at least one edge connecting a first node to a second node is inferred by the online social network, wherein the inference is based at least in part on a content of a content object corresponding to the first node and a content of a content object corresponding to the second node.

11. The method of claim 10, wherein the content object is a post, a comment, a third-party application, or a social graph tag.

12. The method of claim 1, wherein at least one edge connecting a first node to a second node is inferred by the online social network, wherein the inference is based at least in part on a term-frequency-inverse-document-frequency (tf-idf) analysis of a content of a content object corresponding to the first node and a content of a content object corresponding to the second node.

13. The method of claim 1, wherein at least one edge connecting a first node to a second node is inferred by the online social network, wherein the inference is based at least in part on a topic extraction analysis of a content of the content object corresponding to a first node and a content of the content object corresponding to a second node.

14. The method of claim 1, wherein at least one edge connecting a first node to a second node is inferred by the online social network, wherein the inference is based at least in part on a sentiment analysis of a content of the content object corresponding to a first node and a content of the content object corresponding to a second node.

15. The method of claim 1, wherein scoring each identified external content object based on the connectivity of the external node to the one or more internal nodes comprises assigning a score based at least in part on a content associated with the internal content objects corresponding to internal nodes connected to the external node.

16. The method of claim 1, wherein scoring each identified external content object based on the connectivity of the external node to the one or more internal nodes comprises assigning a score based at least in part on a content associated with the external node in the enhanced search index.

17. The method of claim 1, further comprising scoring each identified external content object based at least in part on one or more of:
    a number of degrees of separation between the external node and one or more internal nodes;
    a number of impressions of the external node; or
    a number of interactions associated with the external node.

18. The method of claim 17, wherein each interaction is a share, a like, a comment, or a re-share.

19. The method of claim 1, further comprising generating a snippet corresponding to each identified external content object, wherein the snippet comprises contextual information about the second node corresponding to the identified external content object.

20. The method of claim 19, wherein each snippet comprises one or more references to one or more internal nodes and one or more edges connecting the one or more internal nodes to the external node corresponding to the identified external content object corresponding to the snippet.

21. One or more computer-readable non-transitory storage media embodying software that is operable when executed by one or more computing devices of an online social network to:
- access, by the one or more computing devices, an enhanced search index of the online social network comprising data from a social graph having a plurality of nodes and a plurality of edges connecting the nodes, each of the edges between two of the nodes representing a single degree of separation between them, the nodes comprising:
  - a first node corresponding to a first user associated with the online social network;
  - a plurality of internal nodes corresponding to a plurality of internal content objects and a plurality of second users associated with the online social network, each internal content object comprising user-generated content; and
  - a plurality of external nodes corresponding to a plurality of external content objects, respectively, each of the external nodes being connected to at least one or more of the internal nodes by at least one edge, each of the external nodes being associated with the content of the one or more internal content objects corresponding to the internal nodes connected to the external node, and each external content object comprising content and being stored on a third-party system separate from and external to the online social network;
- receive, at the one or more computing devices, a query from a client system of the first user, wherein the query comprises one or more keywords;
- search, by the one or more computing devices, the content in the enhanced search index associated with each external node of a plurality of external nodes to identify one or more external content objects corresponding to one or more external nodes, respectively, of the plurality of external nodes that are connected to internal nodes corresponding to internal content objects comprising user-generated content that matches the query, wherein the content of one or more of the external content objects does not match the one or more keywords of the query;
- score, by the one or more computing devices, each identified external content object based at least in part on: (1) a text similarity between the content of the identified external content object and the query and, (2) a connectivity of the external node corresponding to the identified external content object to the one or more connected internal nodes; and
- send, by the one or more computing devices to the client system responsive to the received query, instructions for presenting a search-results interface comprising references to one or more of the identified external content objects for display to the first user, each identified external content object referenced in the search-results interface having a score greater than a threshold score.

22. A system comprising: one or more processors; and a memory coupled to the processors comprising instructions executable by the processors, the processors operable when executing the instructions to:
- access, by the one or more computing devices, an enhanced search index of an online social network comprising data from a social graph having a plurality of nodes and a plurality of edges connecting the nodes, each of the edges between two of the nodes representing a single degree of separation between them, the nodes comprising:
  - a first node corresponding to a first user associated with the online social network;
  - a plurality of internal nodes corresponding to a plurality of internal content objects and a plurality of second users associated with the online social network, each internal content object comprising user-generated content; and
  - a plurality of external nodes corresponding to a plurality of external content objects, respectively, each of the external nodes being connected to at least one or more of the internal nodes by at least one edge, each of the external nodes being associated with the content of the one or more internal content objects corresponding to the internal nodes connected to the external node, and each external content object comprising content and being stored on a third-party system separate from and external to the online social network;
- receive a query from a client system of the first user, wherein the query comprises one or more keywords;
- search, by the one or more computing devices, the content in the enhanced search index associated with each external node of a plurality of external nodes to identify one or more external content objects corresponding to one or more external nodes, respectively, of the plurality of external nodes that are connected to internal nodes corresponding to internal content objects comprising user-generated content that matches the query, wherein the content of one or more of the external content objects does not match the one or more keywords of the query;
- score, by the one or more computing devices, each identified external content object based at least in part on: (1) a text similarity between the content of the identified external content object and the query and, (2) a connectivity of the external node corresponding to the identified external content object to the one or more connected internal nodes; and
- send, by the one or more computing devices to the client system responsive to the received query, instructions for presenting a search-results interface comprising references to one or more of the identified external content objects for display to the first user, each identified external content object referenced in the search-results interface having a score greater than a threshold score.

23. The method of claim 1, wherein the references are links to the external content objects.

24. The system of claim 22, wherein at least one of the internal nodes is provided by a user of the online social network.

25. The system of claim 22, wherein at least one of the external nodes is generated by crawling, by the online social network, the third-party system.

26. The system of claim 22, wherein at least one edge associated with the external nodes is crawled by the online social network.

27. The system of claim 22, wherein at least one identified external content object is provided by a user of the online social network.

28. The system of claim 22, wherein at least one identified external content object is a webpage hosted by the third-party system.

29. The system of claim 22, wherein at least one identified external content object is a multimedia content object.

30. The system of claim 22, wherein at least one edge connecting an external node to an internal node is created by the online social network in response to an explicit action, the explicit action indicating a relationship between the external node and the internal node.

31. The system of claim 30, wherein the internal node corresponds to a user of the online social network and the explicit action is initiated by the user.

32. The system of claim 22, wherein at least one edge connecting a first node to a second node is inferred by the online social network, wherein the inference is based at least in part on a content of a content object corresponding to the first node and a content of a content object corresponding to the second node.

33. The system of claim 32, wherein the content object is a post, a comment, a third-party application, or a social graph tag.

34. The system of claim 22, wherein at least one edge connecting a first node to a second node is inferred by the online social network, wherein the inference is based at least in part on a term-frequency-inverse-document-frequency (tf-idf) analysis of a content of a content object corresponding to the first node and a content of a content object corresponding to the second node.

35. The system of claim 22, wherein at least one edge connecting a first node to a second node is inferred by the online social network, wherein the inference is based at least in part on a topic extraction analysis of a content of the content object corresponding to a first node and a content of the content object corresponding to a second node.

36. The system of claim 22, wherein at least one edge connecting a first node to a second node is inferred by the online social network, wherein the inference is based at least in part on a sentiment analysis of a content of the content object corresponding to a first node and a content of the content object corresponding to a second node.

37. The system of claim 22, wherein the instructions to score each identified external content object based on the connectivity of the external node to the one or more internal nodes comprise instructions to assign a score based at least in part on a content associated with the internal content objects corresponding to internal nodes connected to the external node.

38. The system of claim 22, wherein the instructions to score each identified external content object based on the connectivity of the external node to the one or more internal nodes comprise instructions to assign a score based at least in part on a content associated with the external node in the enhanced search index.

39. The system of claim 22, wherein the processors are further operable when executing the instructions to:
score each identified external content object based at least in part on one or more of:
a number of degrees of separation between the external node and one or more internal nodes;
a number of impressions of the external node; or
a number of interactions associated with the external node.

40. The system of claim 39, wherein each interaction is a share, a like, a comment, or a re-share.

41. The system of claim 22, wherein the processors are further operable when executing the instructions to:
generate a snippet corresponding to each identified external content object, wherein the snippet comprises contextual information about the second node corresponding to the identified external content object.

42. The system of claim 41, wherein each snippet comprises one or more references to one or more internal nodes and one or more edges connecting the one or more internal nodes to the external node corresponding to the identified external content object corresponding to the snippet.

43. The system of claim 22, wherein the references are links to the external content objects.

* * * * *